United States Patent Office 3,524,765
Patented Aug. 18, 1970

3,524,765
WELDING ROD FOR WELDING STEEL CONTAINING 9% Ni
Tomokazu Godai and Toru Sugiyama, Kamakura-shi, Japan, assignors to Kobe Steel Ltd., Kobe, Japan
Filed Feb. 20, 1967, Ser. No. 617,331
Claims priority, application Japan, Feb. 20, 1966, 41/10,202
Int. Cl. B23k 35/30, 35/36
U.S. Cl. 117—205       4 Claims

ABSTRACT OF THE DISCLOSURE

A welding rod for welding steel containing 9% Ni. The core wire of the welding rod contains 42–52% Ni and 11–17% Cr besides Fe, and either the core wire or the flux coating thereon contains 3–9% Mn, 1–4.5% Mo and 0.1–1.3% C in proportion to the weight of the core wire. The flux coating on the core wire comprises a binder, carbonates of alkaline earth metals, fluorite, rutile, silica sand, mica, Fe-Ti and if desired Fe-Si in addition to any Mn, Mo and C present. The weight of the flux coating is 20 to 35 percent of the total weight of the welding rod.

BACKGROUND OF THE INVENTION

Recently, the demand for liquid gas for use in the chemical industry and metallurgical industry has increased, and materials capable of withstanding extremely low temperatures have been developed for use in liquefying the gas and storing or transporting it. Table 1 shows the boiling points of gases presently in common use in the chemical and metallurgical industries.

TABLE 1
Boiling point of various gases (° C.)

| | |
|---|---|
| Propylene | 47 |
| $CO_2$ | 78.5 |
| Acetylene | 84 |
| Ethane | 89 |
| Ethylene | 103 |
| Methane | 161 |
| Oxygen | 183 |
| Argon | 186 |
| Nitrogen | 196 |
| Hydrogen | 253 |
| Helium | 269 |

Steel containing 3.5% Ni has been developed for use at temperatures ranging down to −100° C.; steel containing 9% Ni has been developed for use at temperatures ranging from −100° C. to −196° C.; steel containing 36% Ni has been developed for use at temperatures below −196° C.

SUMMARY OF THE INVENTION

The welding rod of the present invention is intended for use in the welding of steel containing about 9% Ni.

This welding rod is useful for welding so-called 9% Ni steel so as to give the weld portion thereof high tensile strength and high impact value without forming harmful blow holes.

The inventive concept of the present invention lies in addition of 3–9% Mn, 1–4.5% Mo and 0.1–1.3% C, to the welding rod, containing 42–52% Ni and 11–17% Cr besides Fe so as to provide a weld portion having a coefficient of thermal expansion substantially the same as that of the base metal to be welded, and also lies in the prevention of forming blow holes in the weld metal by selecting a weight of flux coating within the range of 20%–35% of the total weight of the welding rod, said flux being selected to contain 34–70% carbonate of alkaline earth metals, 15–35% fluorite, 1–8% rutile, 2–10% silica sand, 2–5% mica and an appropriate quantity of bonding agent, said flux further containing either (Fe-Ti) alone or (Fe-Ti) together with (Fe-Si), the content of (Fe-Si)+(Fe-Ti) being above 1.5% of the weight of the core wire as calculated, the content of (Fe-Si) being below 2% (including 0%) based on weight of the core wire, and the content of Ti being below 9% based on the weight of the flux as calculated under the condition that the content of Si in said (Fe-Si) is assumed to be 50% and the content of Ti in said (Fe-Ti) is assumed to be 45%.

DETAILED DESCRIPTION OF THE PREFERRED EMBODIMENTS

Figure 1:
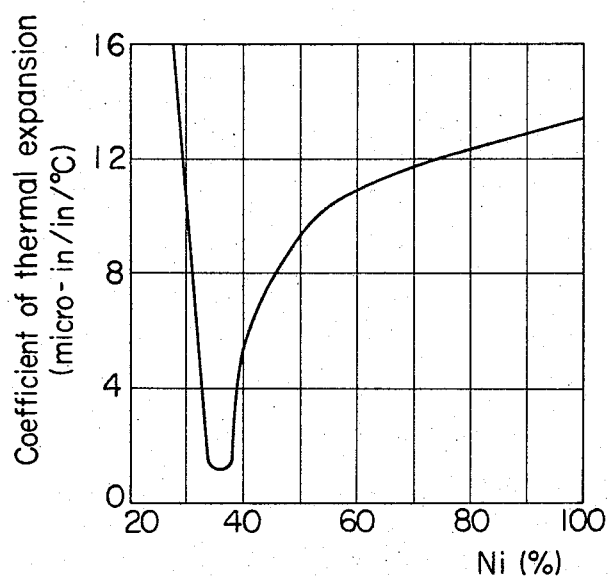
FIG. 1 is a graph showing the coefficient of thermal expansion of Fe-Ni steel alloy.

In general, the so-called 9% Ni steel is a low carbon steel alloy which contains about 9% Ni and which has high tensile strength and high impact value, for example, tensile strength of above 100,000 p.s.i. (70.3 kg./mm.$^2$) at room temperature in ASME Standard, Charpy impact value of above 25 ft.-lb. (3.5 kg.-m.) using V-notch of 2 mm. at the temperature of −196° C. (see Table 2). The 9% Ni steel is provided with these properties because it is usually used in the state of quenching-tempering or two stepped normalizing-tempering.

TABLE 2.—STANDARD FOR 9%-NI STEEL
(From Case 1308–4 of ASME)

| (1) | Chemical composition (percent) | C | Mn | Si | P | S | Ni |
|---|---|---|---|---|---|---|---|
| | | <0.13 | <0.90 | 0.15–0.30 | <0.035 | <0.035 | 8.50–950 |

| (2) | Tensile strength | Tensile strength | Yield point | | | Elongation |
|---|---|---|---|---|---|---|
| | Base metal | 100,000–120,000 p.s.i. (70.3–84.4 kg./mm.$^2$) | ≥75,000 p.s.i. (52.7 kg./mm.$^2$) | | | ≥22% |
| | Joined portion by welding | ≥95,000 p.s.i. ≥(66.8 kg./mm.$^2$) | | | | |

| (3) | Impact value (2mm. V notch-196° C.) | Test piece (mm.) | Impact value |
|---|---|---|---|
| | Heat treatment, quench/temper | 2.5 x 10 x 55 | 15 ft.-lb. (2.1 kg.-m.) |
| | | 5 x 10 x 55 | 19 ft.-lb. (2.7 kg.-m.) |
| | | 7.5 x 10 x 55 | 23 ft.-lb. (3.2 kg.-m.) |
| | | 10 x 10 x 55 | 30 ft.-lb. (4.2 kg.-m.) |
| | Two stepped, normalize/temper | 2.5 x 10 x 55 | 13 ft.-lb. (1.8 kg.-m.) |
| | | 5 x 10 x 55 | 16 ft.-lb. (2.2 kg.-m.) |
| | | 7.5 x 10 x 55 | 19 ft.-lb. (2.7 kg.-m.) |
| | | 10 x 10 x 55 | 25 ft.-lb. (3.5 kg.-m.) |

TABLE II—Continued

| (4) Example 1 (Quench/temper) | Chemical composition (percent) | | | | | |
|---|---|---|---|---|---|---|
| | C | Mn | Si | P | S | Ni |
| | 0.06 | 0.41 | 0.24 | 0.009 | 0.004 | 8.84 |

| Mechanical Properties | | | |
|---|---|---|---|
| Yield point | Tensile strength | Elongation | Impact value (2 mm. V) |
| 77.0 kg./mm.$^2$ | 82.0 kg./mm.$^2$ | 32.0% | 9.3 kg.-m./cm.$^2$ |

There has only been developed Inconel welding rod for use in welding such a steel referred to above. The chemical composition and the mechanical properties of the Inconel welding rod are shown in Tables 3 and 4.

TABLE 3

Typical Chemical Composition (%) of the Core Wire of the Inconel Welding Rod

| | |
|---|---|
| C | 0.05 |
| Mn | 1.69 |
| Si | 0.20 |
| Ni | 70.41 |
| Cr | 14.77 |
| Cb | 1.86 |
| Mo | 0.61 |
| Fe | 8.32 |

TABLE 4

Mechanical properties of metal welded by using the welding rod according to Table 3

Tensile strength—65.1 kg./mm.$^2$
Elongation—45%
Impact value (2V. − 196° C.)—12.71 kg.-m./cm.$^2$ The Inconel welding rod is expensive, because it contains a large percentage of Ni, and the yield in a rolling process is low because it contains Cb besides a large quantity of Ni. Therefore, the cost of producing Inconel welding rod is high. It is said that the cost of welding rods amounts to 20–30% of the total cost of the materials used in construction work utilizing 9% Ni steel. The coefficient of thermal expansion of the above welding rods is on the order of 9.7×10$^{-6}$/° C. which is substantially different from the coefficient of thermal expansion of the base material made of 9% Ni steel which is on the order of 8.6×10$^{-6}$/° C. Therefore, danger of fatigue failure in the welded portion exists due to the stresses therein resulting from the difference in the coefficient of thermal expansion of the materials used in the construction during the charge and discharge of the gases kept at such a low temperature.

Furthermore, the welding rods presently used tend to generate blow holes in the welded portion, especially in vertical welding and overhead welding because they have less workability; accordingly, only highly skilled welders can be employed and this means more time and money must be spent for training the welders.

The present invention, taking the above facts into consideration, provides a welding rod which can give a weld having a coefficient of thermal expansion equal to that of the base metal made of 9% Ni steel and which is inexpensive and has good workability. The welding rod in accordance with the present invention contains 42–52% Ni and 11–17% Cr by weight within the steel core wire thereof, and also contains 3–9% Mn, 1–4.5% Mo, 0.1–1.3% C by weight within either said core wire or the coating of flux.

The actuation and the effectiveness of the welding rod in accordance with the present invention will be described in detail hereinafter referring to the attached drawings.

The influence of Ni on the coefficient of thermal expansion of a steel alloy in which Ni is added to Fe is shown in FIG. 1, for example. As seen in FIG. 1, the coefficient of thermal expansion is lowest at a point near 35% Ni. Therefore, a composition containing 9% Ni, 30% Ni or 50% Ni is most desirable in order to obtain a steel alloy which has a coefficient of thermal expansion substantially equal to that of 9% Ni steel. However, though 9% Ni steel has a coefficient of thermal expansion equal to that of the base metal, it has very low impact value, so it cannot be used. That is, 9% Ni welding metal has low impact value unless it is subjected to heat treatment after welding, whereas the base metal has been given good mechanical properties by the heat treatment prior to the welding. Therefore, 9% Ni welding metal cannot be used for welding by merely adding Ni to Fe. On the other hand. 30% Ni or 50% Ni welding metal has very low tensile strength in comparison with the base metal, for example, a tensile strength on the order of 48–53 kg./mm.$^2$. Such a low tensile strength is not suitable for making a welding rod for use in welding 9% Ni steel.

Figure 2:
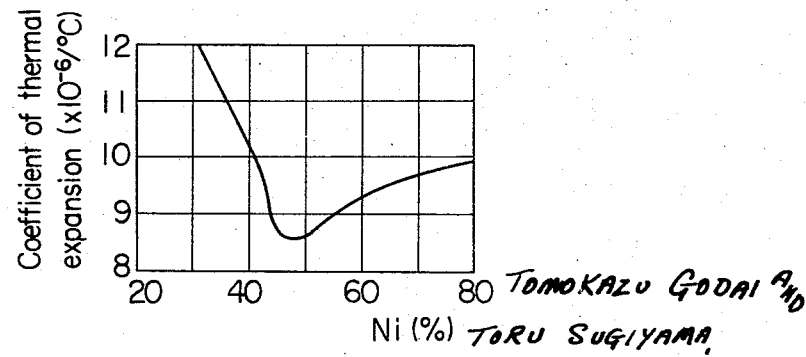
FIG. 2 is a graph showing the coefficient of thermal expansion of Fe-Ni-Cr steel alloy.

It is, therefore necessary to increase the tensile strength of the welding metal by some means. Generally C is added to steel in order to increase tensile strength of the steel. However, in case of Fe-Ni alloy, the tensile strength of such an alloy cannot be increased by adding a large quantity of C, and, further, ductility is greatly reduced, as is apparent from the case of the welding rods for welding Fe-Ni cast iron. The inventors have found that the tensile strength of Fe-Ni alloy can be greatly improved when Cr is added thereto provided that C is included in said alloy. However, the measurement of the average value of coefficient of thermal expansion of Fe-Ni-Cr alloy including 11–16% Cr, for example, at a temperature in the range of 0° C. to −196° C. resulted in the values as shown in FIG. 2. This shows that it is difficult to obtain a coefficient of thermal expansion on the same order as that of 9% Ni base metal if the Ni content is about 30%.

From the above facts it is appreciated that the addition of Ni must be on the order of 50%. However, the influence of addition of Cr on the tensile strength of Fe-Ni welding metal is very effective when CR is added up to 18%. However, sufficient mechanical strength of the weld of 9% Ni steel cannot be obtained by merely taking such a measure, and, furthermore, the tenacity of such a metal is reduced. Therefore, it is necessary to increase the mechanical strength of the metal by adding some other elements.

Various tests were made by adding Cb, Mo, V, W, Co, Mn, Si, etc., to Ni-Cr-Fe-C alloy in order to increase the mechanical strength thereof. The results were as follows:

(1) Addition of Cb greatly increases the tensile strength, whereas it greatly reduces tenacity of the alloy and tends to cause cracks in the weld.

(2) Addition of W or V increases tensile strength of the alloy slightly; however, tenacity is greatly reduced and the resistance to cracking is very much reduced.

(3) Addition of Co has no substantial influence on the tensile strength and tenacity.

(4) Addition of Mo is effective to increase tensile strength; however, addition of too much Mo is not so effective. Reduction of the tenacity is relatively low in comparison with that resulting from the addition of other elements. Furthermore, the addition of Mo is effective to improve resistance to cracking.

(5) Addition of Mn slightly reduces tenacity and improves the resistance to cracking.

(6) Addition of Si has no substantial influence on the tensile strength and tenacity, and, further, it greatly reduces the resistance to cracking. Therefore, the smaller the quantity of Si, the better the results obtained.

From the above results, addition of Mo is effective to increase tensile strength of Fe-Ni-Cr alloy and also effective not to substantially reduce tenacity. And the addition of Mo and Mn is preferred to improve the resistance to cracking.

The present invention provides a welding rod for welding 9% Ni steel wherein C is added to Ni-Cr-Mo alloy and the quantity of each of the elements is kept within a predetermined range.

The details of the composition of the welding rod in accordance with the present invention are set forth below.

Table 5 shows an example of the influence of Ni and Cr on the mechanical property when Ni is added to the welding metal for 9% Ni steel. This table shows that a Ni content below 42% or more than 52% is not desirable, because the coefficient of thermal expansion exceeds $9.0 \times 10^{-6}/°C$. which is far from that of 9% Ni steel. Therefore, the Ni content of the core wire of the welding rod should be kept within the range of 42–52%. (The yield of Ni from the core wire to the welded metal is about 100%.) The Cr content should be within the range of 11–16%, because a Cr content below 11% results in insufficient tensile strength and a Cr content above 16% results in insufficient impact value. However, the yield of Cr from the core wire to the welded metal is about 95%, and therefore, the upper limit of the Cr content is made 17% in consideration of said yield. It has been found from past experience that a tensile strength of 64 kg./mm.$^2$ of the total welding metal results in a tensile strength of 95,000 p.s.i. (66.8 kg./mm.$^2$) in the weld of 9% Ni steel. This is due to the fact that the strength of the weld is reinforced by the strength of the base metal.

TABLE 5.—INFLUENCE OF Ni, Cr ON THE WELDED METAL OF 9% Ni STEEL

| No. | Chemical Composition of the Welded Metal (Percent) | | | | | Mechanical Properties (See Remarks) | | |
|---|---|---|---|---|---|---|---|---|
| | C | Mn | Si | Cr | Ni | Mo | A | B | C |
| 1 | 0.17 | 3.27 | 0.18 | 15.24 | 39.27 | 2.10 | 67.2 | 8.92 | 10.41 |
| 2 | 0.19 | 3.21 | 0.20 | 13.72 | 41.85 | 2.34 | 68.9 | 8.73 | 9.31 |
| 3 | 0.16 | 3.42 | 0.24 | 13.21 | 45.27 | 2.52 | 65.4 | 8.99 | 8.53 |
| 4 | 0.18 | 3.63 | 0.20 | 13.63 | 48.71 | 2.47 | 65.8 | 9.53 | 8.62 |
| 5 | 0.21 | 3.02 | 0.23 | 13.59 | 50.42 | 2.31 | 68.2 | 9.71 | 8.83 |
| 6 | 0.17 | 3.71 | 0.19 | 13.41 | 53.32 | 2.46 | 66.6 | 8.84 | 9.18 |
| 7 | 0.19 | 2.82 | 0.17 | 10.21 | 49.29 | 2.10 | 62.1 | 12.62 | 8.76 |
| 8 | 0.17 | 3.41 | 0.23 | 11.76 | 48.03 | 2.15 | 64.9 | 10.73 | 8.52 |
| 9 | 0.18 | 3.02 | 0.18 | 15.42 | 47.02 | 2.42 | 68.9 | 5.32 | 8.80 |
| 10 | 0.18 | 2.96 | 0.19 | 17.37 | 46.71 | 2.31 | 70.7 | 3.56 | 8.83 |

Remarks:
A = Tensile Strength (kg/mm$^2$).
B = Impact Value (kg.-m./cm.$^2$, 2V, −196° C.)
C = Coefficient of Thermal Expansion ($\times 10^{-6}/°C$.; 0— −196° C.).

Table 6 shows the effect of C on the tensile strength and tenacity. This table shows that a C content below 0.14% does not provide sufficient strength, and a C content above 0.25% results in a decrease in impact value as well in a decrease in resistance to cracking. Therefore, the content of C should be selected within the range of 0.14–0.25%. However, the yield of C from the core wire to the welded metal is in general on the order of 20%. Therefore, introduction of C by 0.25% into the welded metal cannot be effected unless C is contained in the core wire in a concentration on the order of 1.3%. Alternatively, the necessary quantity of C may be added from the flux coating in an appropriate manner instead of introducing it from the core wire.

TABLE 6.—INFLUENCE OF C ON THE WELDED METAL OF 9%-NI STEEL

| No. | Chemical Composition of the Welded Metal (Percent) | | | | | Mechanical Properties (See Remarks) | | |
|---|---|---|---|---|---|---|---|---|
| | C | Mn | Si | Cr | Ni | Mo | A | B | C |
| 11 | 0.11 | 3.47 | 0.27 | 13.42 | 47.21 | 2.47 | 60.37 | 13.71 | 0 |
| 12 | 0.14 | 3.03 | 0.19 | 14.31 | 47.36 | 2.41 | 63.94 | 11.45 | 5 |
| 13 | 0.23 | 3.11 | 0.21 | 12.97 | 47.25 | 2.52 | 70.61 | 7.82 | 0 |
| 14 | 0.26 | 3.19 | 0.25 | 14.03 | 47.41 | 2.26 | 70.92 | 3.91 | 13 |
| 15 | 0.29 | 3.17 | 0.18 | 13.63 | 47.29 | 2.17 | 73.82 | 2.19 | 41 |

Remarks:
A, B = The same as those in Table 5.
D = Crack in Bead (Percent). (Except crater crack.) The tests were made in accordance with the JISC JIG Restriction Method. The base metal was 9%-Ni steel of 25mm. thickness, gap being 2 mm., electric current being 130 amp, D.C.R.P.

In table 7, the effect of Mn, Mo and Si is shown.

When the addition of Mn exceeds 2%, there is improved resistance to cracking of the weld metal; however, if the proportion of Mn exceeds 6%, the tensile strength is lowered. Therefore, the proportion of Mn is preferably selected in the range of 2–6%. Assuming that the yield of Mn from the core wire to the weld metal is about 65%, Mn should be added to the core wire in the amount of 3–9%, or alternatively, a corresponding amount of Mn may be added to the flux coating of the welding rod.

TABLE 7.—INFLUENCE OF Mn, Mo, AND Si ON THE WELD METAL OF 9%-Ni STEEL

| No. | Chemical Composition (percent) of the weld metal | | | | | Mechanical Properties (See Remarks) | | |
|---|---|---|---|---|---|---|---|---|
| | C | Mn | Si | Cr | Ni | Mo | A | B | D |
| 16 | 0.18 | 1.65 | 0.19 | 13.51 | 49.37 | 2.11 | 67.2 | 8.86 | 37 |
| 17 | 0.19 | 2.46 | 0.21 | 13.43 | 49.12 | 2.26 | 67.4 | 8.74 | 10 |
| 18 | 0.19 | 4.13 | 0.22 | 13.03 | 47.93 | 2.25 | 65.3 | 8.32 | 0 |
| 19 | 0.17 | 5.76 | 0.24 | 12.83 | 48.52 | 2.18 | 64.2 | 9.57 | 0 |
| 20 | 0.19 | 6.41 | 0.21 | 12.91 | 47.67 | 2.14 | 62.7 | 6.41 | 0 |
| 21 | 0.18 | 3.11 | 0.25 | 13.14 | 47.21 | 0.16 | 61.9 | 13.10 | 12 |
| 22 | 0.18 | 2.97 | 0.23 | 12.76 | 47.63 | 1.21 | 64.2 | 11.29 | 3 |
| 23 | 0.19 | 2.83 | 0.18 | 13.59 | 48.14 | 3.70 | 66.3 | 7.53 | 0 |
| 24 | 0.17 | 3.41 | 0.19 | 14.08 | 47.51 | 4.24 | 68.2 | 7.89 | 0 |
| 25 | 0.18 | 3.27 | 0.23 | 13.26 | 46.90 | 5.63 | 67.3 | 3.92 | 0 |
| 26 | 0.16 | 3.51 | 0.52 | 13.77 | 48.92 | 2.16 | 65.9 | 8.65 | 33 |
| 27 | 0.23 | 2.93 | 0.37 | 14.25 | 50.30 | 2.30 | 69.2 | 7.21 | 16 |

Remarks:
A, B = The same as those in Table 5.
D = The same as that in Table 6.

Addition of Mo also increases the tensile strength of the weld metal. However, if the amount of Mo exceeds 4%, the tensile strength is lowered and a sharp drop in the impact value occurs. Therefore, the addition of Mo above 4% is not advantageous, and Mo should be added in the amount of 1–4%, because the tensile strength is not increased unless at least 1% Mo is added. The yield of Mo from the core wire to the welded metal is generally about 95%; therefore, Mo in the amount of 4.5% must be added to the core wire in order to obtain the upper limit of the content of Mo. Alternatively, the corresponding amount of Mo may be added to the flux coating instead of the core wire.

Addition of Si greatly lowers the resistance against generation of cracks. Therefore the amount of Si selected to be as little as possible. It is preferable to limit the amount of Si below 0.3%. Therefore, the amount of Fe-Si deoxidization agent usually employed in a welding rod should be as little as possible, and Fe-Ti or Fe-Al is preferably used as the deoxidation agent in place of Fe-Si. But addition of Al may cause a decrease in the resistance against generation of cracks. Therefore, the present invention is characterized by using Fe-Ti as deoxidization agent as will be described in detail hereinafter.

From the facts as set forth hereinabove referring to the tables, the welding rod in accordance with the present invention is characterized not only in that the core wire thereof contains 42–52% Ni and 11–17% Cr besides Fe, but also in that 3–9% Mn, 1–4.5% Mo and 0.1–1.3% C in proportion to the weight of the core wire are added either to the core wire or the flux coating. When a welding rod having the above composition is used in the arc welding of 9% Ni steel, a weld metal having good workability and the same coefficient of thermal expansion as that of the base metal as well as superior mechanical properties can easily be obtained at lower cost.

The welding rod having a flux coating thereon, in accordance with the present invention belongs to high Ni-containing welding rod, and such a high Ni-containing welding rod, like the above stated Inconel welding rod, tends to generate blow holes very easily. Therefore, in the operation of vertical and overhead welding, it is necessary to effect sufficient gas shielding, and hence, it is preferable to coat the core wire with a so-called low hydrogen flux containing a large quantity of lime stone. The results obtained in various tests, indicate that the $CO_2$ content should be above 9% with respect to the weight of the core wire to effect gas shielding so as to prevent the generation of blow holes during the welding operation. In order to achieve the above effect, the flux coating should contain lime stone in an amount of 34-70% with respect to the total weight of the welding rod. The lower limit of the lime stone content is the minimum amount necessary for preventing the generation of blow holes in using the welding rod having a coating ratio of 35%. The upper limit of the lime stone content is determined on the basis of the fact that the addition of lime stone in excess of the above upper limit will hamper the welding operation. If necessary, part of the lime stone component may be replaced by some carbonate of the other alkaline earth metals.

As stated hereinabove, the present invention is also characterized in that Fe-Ti alone or Fe-Ti together with Fe-Si is added to the flux coating as the deoxidization agent of the welding rod. Both Fe-Si and Fe-Ti serve to prevent the formation of blow holes. As to the quantity of Fe-Si, calculated as containing 50% Si, it is necessary to add more than 1.5% of Fe-Si for preventing the formation of blow holes, if Fe-Si is used alone. However, by such a measure, the quantity of Si in the weld metal increases and, hence, deteriorates the resistance to cracking. Therefore, the amount of Fe-Si is reduced and Fe-Ti is added in place of reduced Fe-Si in order to compensate for the lowered resistance to cracking. The quantity of Fe-Ti is determined in a manner such that the quantity of (Fe-Si)+(Fe-Ti), calculated as containing 50% Si and 45% Ti, respectively, is more than 1.5% in proportion to the weight of the core wire and, under the condition that Fe-Ti is used together with Fe-Si, the quantity of Si is below 1%. For example, in the case of a welding rod having a coating weighing 35% of the total weight of the welding rod, it is necessary that the content of (Fe-Si)+(Fe-Ti) be above 3% and the content of (Fe-Si) be less than 2% (including 0%). And in case of a welding rod having a coating weighing 20% of the total weight of the welding rod, it is necessary that the content of (Fe-Si)+(Fe-Ti) be above 6% and (Fe-Si) less than 4% (including 0%). However, when the content of Ti in the flux is above 9%, the bonding power of the weld metal with the base metal is lowered and the difficulty of separating slag is increased. Therefore, the upper limit of the content of (Fe-Ti) is selected so that the content of Ti is made less than 9%.

As to the composition of flux coating, it is necessary that appropriate quantities of fluorite, rutile, silica sand or the like is used. 2-5% of mica is used to improve the flux coating, and an appropriate quantity of water glass is used as binding agent. Florite is effective to increase the fluidity of the flux; however, a fluorite content less than 15% in proportion to the weight of flux is not sufficient, and a fluorite content in excess of 35% tends to make the arc unstable and will cause blow holes. Therefore, the fluorite content is selected between the above stated limits. Silica sand is effective to increase the bonding power of beads, but a silica sand content in excess of 10% will cause a reduction of Si resulting in introduction thereof into the weld metal thereby lowering resistance to cracking. Therefore, the silica sand content is held to less than 10%. However, at least 2% of silica sand is necessary in order to improve the bonding power of the beads.

Rutile helps to make the arc stable. A rutile content in the range of 1-8% is effective therefor; however, if the rutile content exceeds 8% the bonding power of the beads is reduced.

As stated above, it is also the characteristic feature of the present invention to specify the composition of the flux coating.

Embodiments of the present invention will be shown below.

The core wire and flux were prepared as shown in Table 8, the flux being coated onto the core wire by using 15% in weight of the solution of sodium silicate (Be 43) as the binding agent. The welding rod thus prepared was used to arc weld 9% Ni steel. The mechanical properties obtained by the arc welding wire are shown in Examples 1 and 2 in Table 9.

Then the beveled surfaces were cut for butt welding of the 9% Ni steel material shown in (4) of Table 2 so as to give an angle of 60° between the beveled surfaces forming a V groove for butt welding, and the metal was welded by using the welding rod shown in the aforementioned Example 1 up to the uppermost layer. Thereafter, one layer of the beads on the rear side were scraped off and another weld was applied thereon. Tension test pieces of the joint, impact test pieces and test pieces for thermal expansion were prepared from the test plate in the welded portion. The results of the various tests by using the above test pieces are shown in Example 3 in Table 9. Bending tests were also made by using longitudinal bending test pieces prepared from the aforementioned test plate. The test pieces could be bent at 180° and a radius of 19 mm. without causing any defects in the test pieces.

From the above stated results, it is evident that the welding rod of the present invention has superior characteristic features in welding 9% Ni steel.

TABLE 8.—EXAMPLE OF CHEMICAL COMPOSITION (PERCENT) OF THE WELDING RODS

| | Example 1 | Example 2 |
|---|---|---|
| Core Wire: | | |
| Ni | 47.36 | 46.57 |
| Cr | 13.21 | 12.41 |
| Mn | 4.13 | 3.29 |
| Si | 0.27 | 0.10 |
| C | 0.03 | 0.05 |
| Mo | 0.15 | 2.37 |
| Fe | Bal. | Bal. |
| Flux Coating: | | |
| Lime Stone | 40 | 45 |
| Fluorite | 20 | 23 |
| Rutile | 5 | 5 |
| Silicia Sand | 7 | 7 |
| Fe-Mn (75%) | 5 | 5 |
| Fe-Mo | 12 | |
| Fe-Ti (45%) | 3 | 4 |
| Fe-Si | | 3 |
| Metal Cr | 2 | 2 |
| Graphite | 2 | 2 |
| Mica | 4 | 4 |
| Melting Process of Core Wire | (¹) | (²) |

¹ Air melting.  ² Vacuum.

TABLE 9.—CHEMICAL COMPOSITION AND MECHANICAL PROPERTIES OF THE WELD METAL

| Example | Chemical Composition (percent) | | | | | | Mechanical Properties (See Remarks) | | | |
|---|---|---|---|---|---|---|---|---|---|---|
| | C | Mn | Si | Ni | Cr | Mo | A | B | C | E |
| 1 | 0.18 | 4.69 | 0.29 | 46.92 | 13.59 | 2.01 | 65.8 | 8.72 | 8.7 | 33 |
| 2 | 0.12 | 3.52 | 0.18 | 46.31 | 12.17 | 2.20 | 67.4 | 8.51 | 8.7 | 32 |
| 3 | | | | | | | 70.3 | 9.82 | 8.7 | |

Remarks:
A, B, C = The same as those in Table 5.
E = Elongation (percent).

What is claimed is:

1. A welding rod for welding steel containing 9% Ni, which comprises (1) a core wire which comprises 42-52% Ni, 11-17% Cr and Fe, (2) a flux coating on the core wire consisting essentially of 34-70% carbonate of alkaline earth metals, 15-35% fluorite, 1-8% rutile, 2-10% silica sand, 2-5% mica and an appropriate amount of bonding agent, said flux coating further containing a member selected from the group consisting of (Fe-Ti) and (Fe-Si)+(Fe-Ti), the quantity of said (Fe-Si)+(Fe-Ti)

being above 1.5% by weight of the core wire, the quantity of (Fe-Si) being below 2% (including 0%) based on the weight of the core wire, and the quantity of Ti being below 9% based on the weight of the flux coating as calculated under the condition that the content of Si in said (Fe-Si) is 50% and the content of Ti in said (Fe-Ti) is 45%, the weight ratio of the flux coating to the total weight of the welding rod being 20–35%, and (3) a composition consisting essentially of 3–9% Mn, 1.4.5% Mo and 0.1–1.3% C by weight of the core wire, component (3) being contained in either the core wire or the flux coating.

2. A welding rod according to claim 1, wherein the flux coating is of the low hydrogen type flux.

3. A welding rod in accordance with claim 1, wherein the component (3) is contained in the flux coating.

4. A welding rod in accordance with claim 1, wherein the component (3) is contained in the core wire.

References Cited

UNITED STATES PATENTS

| | | | |
|---|---|---|---|
| 3,181,970 | 5/1965 | Peck et al. | 117—205 |
| 3,184,577 | 5/1965 | Witherell | 117—205 X |
| 3,210,213 | 10/1965 | Cotter et al. | 117—205 |
| 3,211,582 | 10/1965 | Wasserman et al. | 117—205 |
| 3,235,405 | 2/1966 | Quaas | 117—205 X |

ALFRED L. LEAVITT, Primary Examiner

T. E. BOKAN, Assistant Examiner

U.S. Cl. X.R.

117—206, 207; 161—213; 75—128, 171; 148—24, 26